United States Patent
Wang et al.

(10) Patent No.: US 11,372,736 B2
(45) Date of Patent: Jun. 28, 2022

(54) ROLLBACK FOR DEPENDENCY SERVICES IN CLOUD NATIVE ENVIRONMENT

(71) Applicant: International Business Machines Corporation, Armonk, NY (US)

(72) Inventors: Yue Wang, Beijing (CN); Sun Chun Hua, Beijing (CN); Liang Lu, Beijing (CN); Yi Yang Ren, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 16/878,880

(22) Filed: May 20, 2020

(65) Prior Publication Data
US 2021/0365332 A1    Nov. 25, 2021

(51) Int. Cl.
*G06F 11/14* (2006.01)

(52) U.S. Cl.
CPC .... *G06F 11/1474* (2013.01); *G06F 2201/835* (2013.01)

(58) Field of Classification Search
CPC .... G06F 9/5072; G06F 9/547; G06F 11/1474; G06F 2201/835
See application file for complete search history.

(56) References Cited

U.S. PATENT DOCUMENTS

| 10,225,335 | B2 * | 3/2019 | Fu | H04L 67/10 |
| 2019/0220331 | A1 | 7/2019 | Duggal et al. | |
| 2019/0347168 | A1 * | 11/2019 | Giannetti | G06F 9/485 |

FOREIGN PATENT DOCUMENTS

CN    110008271 A    7/2019

OTHER PUBLICATIONS

Rudrabhatla, C. "Comparison of Event Choreography and Orchestration Techniques in Microservice Architecture"; International Journal of Advanced Computer Science and Applications, vol. 9, No. 8, 2018.
Garica-Molina et al. "SAGAS"; ACM O-89791-236-5/87/0005/0249; 1987.
"ServiceComb Project—Implementation of Saga Nov. 2018" https://servicecomb.apache.org/cn/docs/distributed-transactions-saga-implementation/; at least as early as 2018.

* cited by examiner

*Primary Examiner* — Joseph R Kudirka
(74) *Attorney, Agent, or Firm* — Heather Johnston (57) ABSTRACT

Managing multiple chain transaction rollback on a native cloud environment in a Kubernetes distributed system which extends API capabilities to build compensate API mappings which are used to reverse the invocation chain and stores the mappings in a key value store. An embodiment of the present invention extracts the reverse invocation chain from a framework of libraries and mapping API to check whether rollback is necessary when a service fails. An embodiment of the present invention executes an entire whole rollback.

11 Claims, 8 Drawing Sheets

ROLLBACK FOR DEPENDENCY SERVICES IN CLOUD NATIVE ENVIRONMENT

BACKGROUND

The present invention relates to a cloud environment, and more specifically to a rollback for dependency services in a cloud environment.

A Kubernetes distributed system is an open source container-orchestration system for automating application deployment, scaling and management. Many cloud services offer a Kubernetes-based platform or infrastructure as a service, either as a Platform as a Service (PaaS) or as an Infrastructure as a Service (IaaS).

In a Kubernetes distributed system it is common that there are service dependencies and invocation chains with transactions across multiple pod services. When one or more services fail, it is a common solution to require all of the compensate transactions/application program interface (API) idempotent of the whole service chain to be rolled back to make sure data is consistent.

In a conventional distributed system with a plurality of services, during execution of an invocation chain, multiple services make changes during the chain. If one service fails during the chain, the entire invocation chain would fail and data would be inconsistent, requiring that rollback of the whole invocation chain takes place to ensure data consistency.

For such scenarios, a saga, a sequence of local transactions where each transaction updates data within a single service is often used to address service failures, but a saga also has two main drawbacks. A first drawback is that a saga only supports two level transactions, and the second drawback is that a saga requires that all the services must be idempotent.

SUMMARY

According to one embodiment of the present invention, a method of managing multiple chain transaction rollback in a distributed system of at least one federation of a plurality of interconnected pods in communication with a master application programming interface gateway is disclosed. The method comprising the steps of: receiving, by the validator component of the master application programming interface gateway, an indication of a request of a service container of a pod of the plurality of interconnected pods as failed from an application programming interface gateway of the pod; validating, by the validator component, failure of the service container of the pod by: obtaining at least one failed transaction from a request chain of the request of the service container; and reading application programming interface trace mappings from the service containers within the request chain; determining, by the validator component, whether all of the application programming interfaces of the service containers in the request chain have compensate transactions; sending, by the validator component, the trace mappings of the service containers in the request chain that have compensate transactions, to a runner component of the master application programming interface gateway; receiving, by the runner component of the master application programming interface gateway, trace mappings from the validator component; retrieving, by the runner component, a service container needed to rollback by a timestamp sequence; executing, by the runner component, the compensation transactions associated with the service containers in the rollback chain in the timestamp sequence to build the rollback chain; and executing, by the runner component, the rollback chain.

According to another embodiment of the present invention, a computer program product for managing multiple chain transaction rollback is disclosed. The computer program product comprising one or more computer-readable storage media having computer-readable program instructions stored on the one or more computer-readable storage media, said program instructions executable by a master application programming interface gateway computer in a distributed system of at least one federation of a plurality of interconnected pods in communication with the master application programming interface gateway, the master application programming interface gateway computer comprising at least one processor, one or more memories, a validator component, and a runner component. The program instructions execute a computer-implemented method comprising: receiving, by the validator component of the master application programming interface gateway computer, an indication of a request of a service container of a pod of the plurality of interconnected pods as failed from an application programming interface gateways of the pod; validating, by the validator component, failure of the service container of the pod by: obtaining at least one failed transaction from a request chain of the request of the service container; and reading application programming interface trace mappings from the service containers within the request chain; determining, by the validator component, whether all of the application programming interfaces of the service containers in the request chain have compensate transactions; sending, by the validator component, the trace mappings of the service containers in the request chain that have compensate transactions, to a runner component of the master application programming interface gateway computer; receiving, by the runner component of the master application programming interface gateway computer, trace mappings from the validator component; retrieving, by the runner component, a service container needed to rollback by a timestamp sequence; executing, by the runner component, the compensation transactions associated with the service containers in the rollback chain in the timestamp sequence to build the rollback chain; and executing, by the runner component, the rollback chain.

According to another embodiment of the present invention, a computer system is disclosed. The computer system comprising: at least one processor; one or more memories; a runner component; a validator component; one or more computer readable storage media having program instructions executing a computer-implemented method for managing multiple chain transaction rollback in a distributed system of at least one federation of a plurality of interconnected pods, each pod having at least a service container in communication with the computer system. The program instructions comprising: receiving, by the validator component of the master application programming interface gateway computer, an indication of a request of a service container of a pod of the plurality of interconnected pods as failed from an application programming interface gateways of the pod; validating, by the validator component, failure of the service container of the pod by: obtaining at least one failed transaction from a request chain of the request of the service container; and reading application programming interface trace mappings from the service containers within the request chain; determining, by the validator component, whether all of the application programming interfaces of the service containers in the request chain have compensate transactions; sending, by the validator component, the trace mappings of the service containers in the request chain that have compensate transactions, to a runner component of the master application programming interface gateway computer; receiving, by the runner component of the master application programming interface gateway computer, trace mappings from the validator component; retrieving, by the runner component, a service container needed to rollback by a timestamp sequence; executing, by the runner component, the compensation transactions associated with the service containers in the rollback chain in the timestamp sequence to build the rollback chain; and executing, by the runner component, the rollback chain.

According to another embodiment of the present invention, a method of managing multiple chain transaction rollback in a distributed system of at least one first federation of a plurality of interconnected pods and at least one second federation of a plurality of interconnected pods. Each pod having at least a service container and an application programming interface gateway in which the application programming interface gateway of all the pods in the at least one first federation are in communication with a first master application programming interface gateway containing a first validator component and a first runner component. Each pod having at least a service container and an application programming interface gateway in which the application programming interface gateway of all the pods in the at least one second federation are in communication with a second master application programming interface gateway containing a second validator component and a second runner component, the first master application programming interface and the second master application programming interface in communication with a resource lock repository. The method comprising the steps of: the runner component of the first master application programming interface receiving a transaction entry associated with a service container of the first federation or the second federation; the runner component of the first master application programming interface determining service executions of the service containers in a rollback chain; the runner component of the first master application programming interface determining if the service executions of the service containers in the rollback chain require key resources and identifying the required key resources; the runner component of the first master application programming interface determining if the required key resources are locked; and for the required key resources that are not locked, the runner component of the first master application programming interface: locking the key resource with an identifier associated with the first master application programming interface, such that the key resource cannot be used by the second master application programming interface, updating the status of the key resource in the resource lock repository, executing the rollback chain with the associated service executions of the service containers and the required key resources, and after completion of the rollback chain, the runner component of the first master application programming interface releasing the required key resource in the resource lock repository.

According to another embodiment of the present invention, a computer program product for managing multiple chain transaction rollback in a distributed system of at least one first federation of a plurality of interconnected pods and at least one second federation of a plurality of interconnected pods. Each pod having at least a service container and an application programming interface gateway in which the application programming interface gateway of all the pods in the at least one first federation are in communication with a first master application programming interface gateway containing a first validator component computer and a first runner component computer. Each pod having at least a service container and an application programming interface gateway in which the application programming interface gateway of all the pods in the at least one second federation are in communication with a second master application programming interface gateway containing a second validator component computer and a second runner component computer, the first master application programming interface and the second master application programming interface in communication with a resource lock repository. The first validator component computer, the second validator component computer, the first runner component computer and the second runner component computer each comprising at least one processor, one or more memories, one or more computer readable storage media, the computer program product comprising a computer readable storage medium having program instructions embodied therewith. The program instructions executable by the first runner component computer or the second runner component computer to perform a method comprising: receiving, by the runner component computer of the first master application programming interface, a transaction entry associated with a service container of the first federation or the second federation; determining, by the runner component computer of the first master application programming interface, service executions of the service containers in a rollback chain; determining, by the runner component computer of the first master application programming interface, if the service executions of the service containers in the rollback chain require key resources and identifying the required key resources; determining, by the runner component computer of the first master application programming interface, if the required key resources are locked; and for the required key resources that are not locked, the runner component computer of the first master application programming interface: locking the key resource with an identifier associated with the first master application programming interface, such that the key resource cannot be used by the second master application programming interface, updating the status of the key resource in the resource lock repository, executing the rollback chain with the associated service executions of the service containers and the required key resources, and after completion of the rollback chain, releasing, by the runner component computer of the first master application programming interface, the required key resource in the resource lock repository.

According to another embodiment, a computer system for managing multiple chain transaction rollback in a distributed system of at least one first federation of a plurality of interconnected pods and at least one second federation of a plurality of interconnected pods. Each pod having at least a service container and an application programming interface gateway in which the application programming interface gateway of all the pods in the at least one first federation are in communication with a first master application programming interface gateway computer comprising a first validator component, a first runner component, at least one processor, one or more memories, one or more computer readable storage media having program instructions executable by the first master application programming interface gateway computer to perform the program instructions. Each pod having at least a service container and an application programming interface gateway in which the application programming interface gateway of all the pods in the at least one second federation are in communication with a second master application programming interface gateway computer comprising a second validator component, a second runner component, at least one processor, one or more memories, one or more computer readable storage media having program instructions executable by the second master application programming interface gateway computer to perform the program instructions. The program instructions comprising: receiving, by the runner component of the first master application programming interface computer, a transaction entry associated with a service container of the first federation or the second federation; determining, by the runner component of the first master application programming interface gateway computer, service executions of the service containers in a rollback chain; determining, by the runner component of the first master application programming interface gateway computer, if the service executions of the service containers in the rollback chain require key resources and identifying the required key resources; determining, by the runner component of the first master application programming interface gateway computer, if the required key resources are locked; and for the required key resources that are not locked, the runner component of the first master application programming interface gateway computer: locking the key resource with an identifier associated with the first master application programming interface gateway computer, such that the key resource cannot be used by the second master application programming interface gateway computer, updating the status of the key resource in the resource lock repository, executing the rollback chain with the associated service executions of the service containers and the required key resources, and after completion of the rollback chain, releasing, by the runner component of the first master application programming interface gateway computer, the required key resource in the resource lock repository.

DETAILED DESCRIPTION

In an embodiment of the present invention, it will be recognized that a method is disclosed which manages multiple chain transaction rollback on a native cloud environment in a Kubernetes distributed system. The method disclosed resolves the restrictions of a compensate transaction and/or an application program interface (API) idempotent, ensuring that data is consistent when rolling back an entire service chain. The method additionally supports both transactional and non-transactional services using a validator and runner.

An embodiment of the present invention extends API capabilities to build at least one compensate API mapping transaction which is used to reverse the invocation chain and stores the mapping in a key value store. A compensate transaction is one or more transactions required to return a service to an initial state prior to failure. An embodiment of the present invention extracts the reverse invocation chain from a framework of libraries and mapping API to check whether rollback is necessary when a service fails. An embodiment of the present invention executes an entire rollback.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
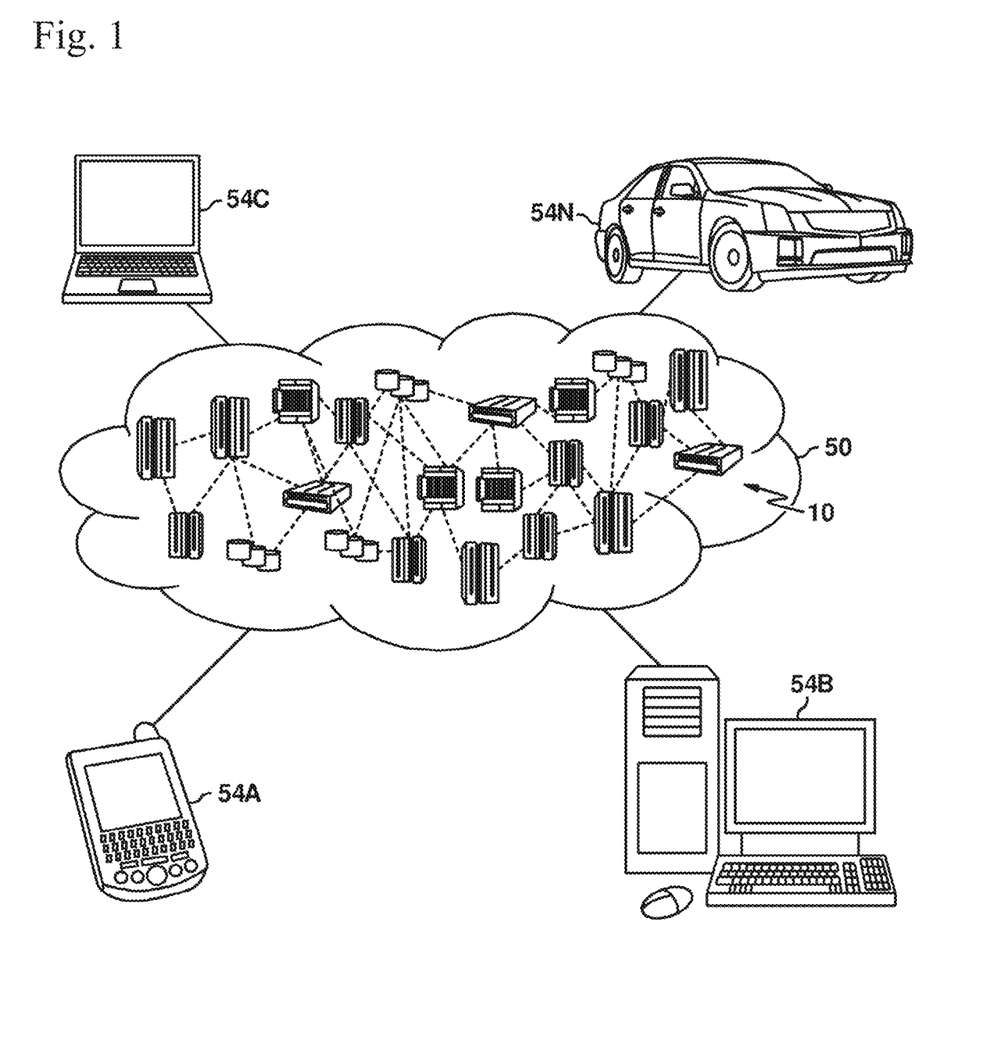
FIG. 1 depicts a cloud computing node according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone MA, desktop computer MB, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
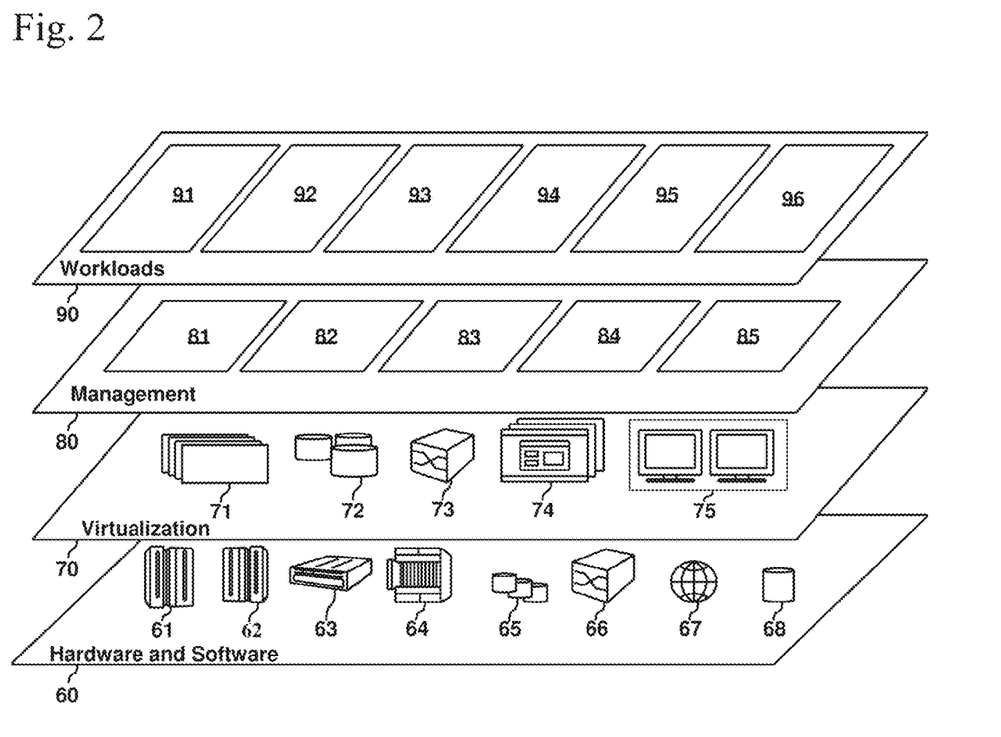
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include rollback service software 67 and network application server software and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and validator and runner execution 96.

Figure 3:
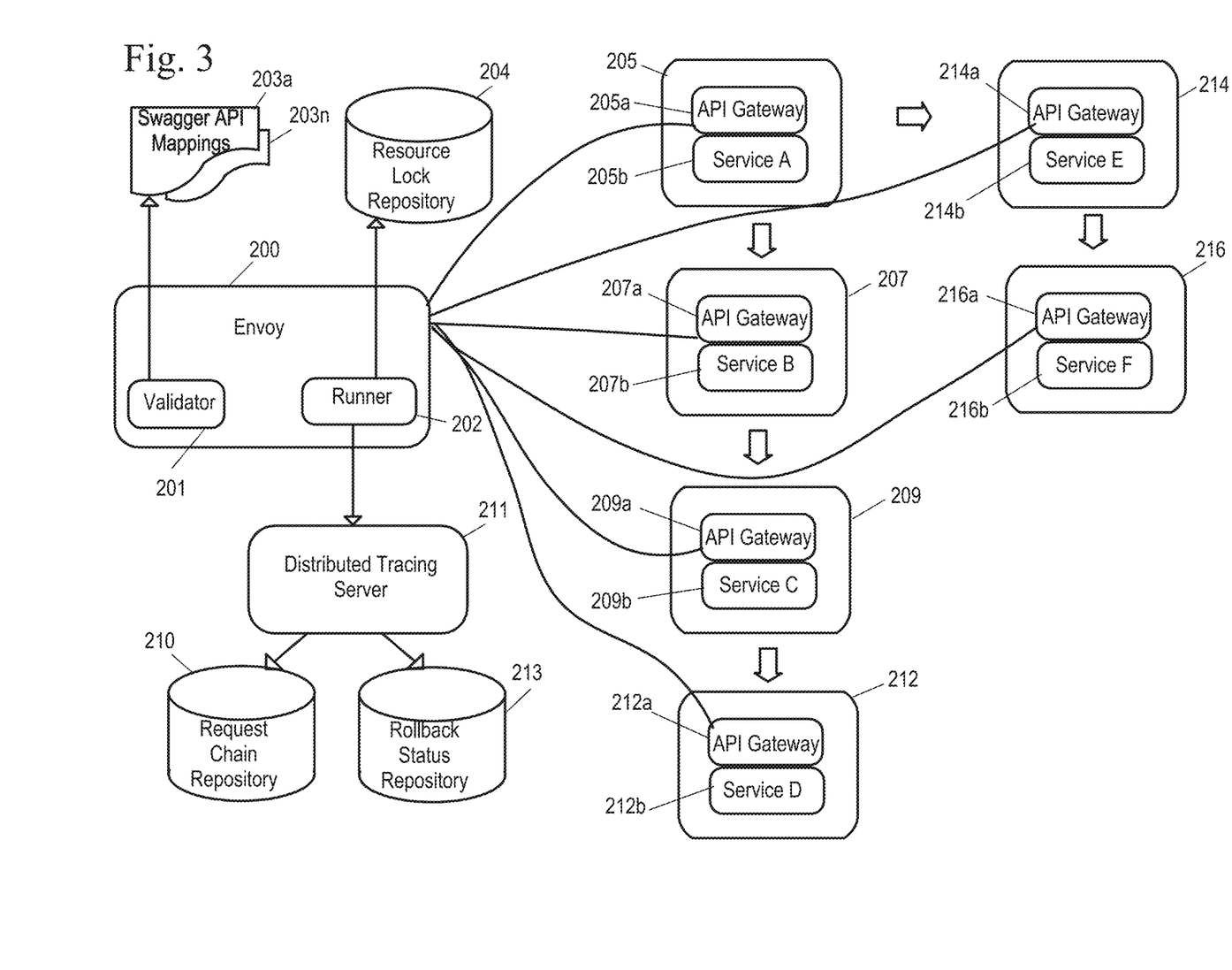
FIG. 3 shows a schematic of pods and their associated services with an envoy of an embodiment of present invention.

FIG. 3 shows a schematic of pods and their associated services with an envoy of an embodiment of present invention.

A plurality of pods 205, 207, 209, 212, 214, 216 are preferably interconnected into a federation. Each of the plurality of pods 205, 207, 209, 212, 214, 216 contains a service container 205b, 207b, 209b, 212b, 214b, 216b as well as an edge service or API Gateway 205a, 207a, 209a, 212a, 214a, 216a, for example Envoy. For example, pod 205 includes a service A container 205b and an API gateway 205a; pod 207 includes a service B container 207b and an API gateway 207a; pod 209 includes a service C container 209b and an API gateway 209a; pod 212 includes a service D container 212b and an API gateway 212a; pod 214 includes a service E container 214b and an API gateway 214a; and pod 207 includes a service F container 216b and an API gateway 216a. Additional pods can be present in the federation, but are limited to six for illustration purposes. Furthermore, additional federations of pods can additionally be present within the system.

The API gateways 205a, 207a, 209a, 212a, 214a, 216a of each of the pods 205, 207, 209, 212, 214, 216 is connected to a master API gateway 200 which includes a validator 201 and a runner 202. It should be noted that each API gateway 205a, 207a, 209a, 212a, 214a, 216a in each of the pods 205, 207, 209, 212, 214, 216 includes programming that monitors and receives tracing information or mappings submitted by applications in the pod via a library, for example request chain repository 210. The validator component 201 is in communication with a plurality of API mappings 203a-203n. The runner component 202 is in communication with a resource lock storage repository 204 and a distributed tracing server 211 with access to repositories of request chains 210, rollback status of pods 213 and their associated services. The validator component 201 determines whether or not rollback of an entire service occurs when a service fails. The runner component 202 generates the reverse invocation chain and executes the rollback.

Figure 4:
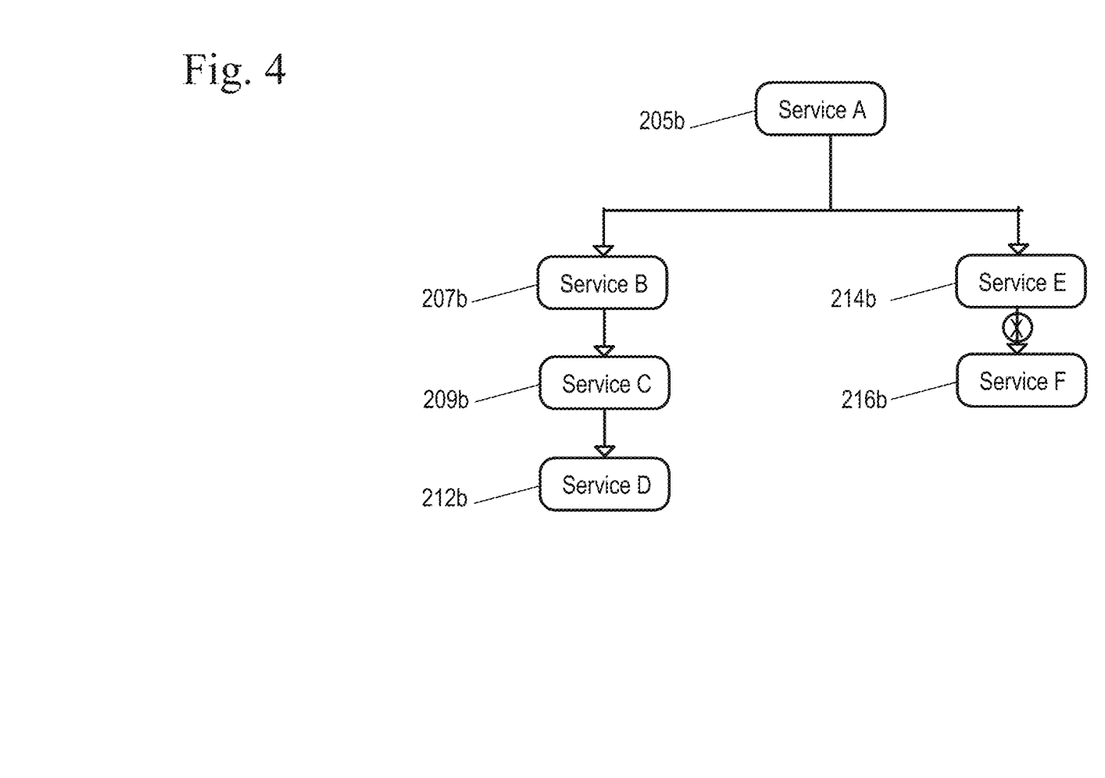
FIG. 4 shows a schematic depicting the relationship of services A-F within the distributed system of an embodiment of the present invention.

FIG. 4 shows a schematic depicting possible relationships between service containers A-F 205a, 207b, 209b, 212b, 214b, 216b within the federation within the distributed system of an embodiment of the present invention. In this example, service A container 205b is connected to Service B container 207b and Service E container 214b. Service B container 207b is connected to Service C container 209b and Service C container 209b is connected to Service D container 212b. Service E container 214b is connected to Service F container 216b. In this example, Service F container 216b had a failure as indicated by the "X". The failure of Service F container 216b is returned to the API gateway 216a of the pod 216 as well as to the master API gateway 200 as a failed request.

Figure 5:
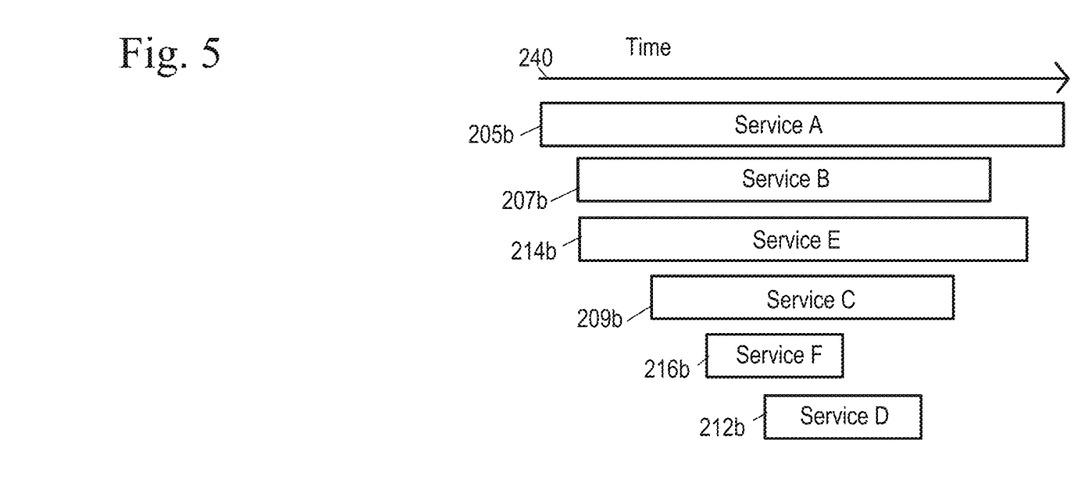
FIG. 5 shows a schematic of distributed tracing services relative to time.

FIG. 5 shows a schematic of distributed tracing services relative to time. Distributed tracing is the process of tracking the activity resulting from a request to an application of a service. Distributed tracing allows for tracing the path of a request as it travels through a system, discovering the latency of the components along that path, discovering which component or service caused a failure of a request. In FIG. 5, time increases from left to right as shown by arrow 240. The longer the associated service container bar extends from left to right, the longer the time the service was in use establishing a time sequence. As shown by this Figure, Service A container 205a was in use the longest and service F container 216b was in use for the shortest amount of time. Based on the amount of time each service container was in use, the reverse invocation chain with an associated time sequence can be determined. In this case, the reverse invocation chain (e.g. the service container used last to first, prior to or at failure) is service F container→service D container→service C container→service B container→service E container→Service A container. The reverse invocation chain is specifically built based on how a time sequence of long a service container was active prior to failure and the possible relationships of the services as indicated in FIG. 4. In order of time used by the services, from longest to shortest is: Service A container→Service E container→Service B container→Service C container→Service D container→Service F container.

For example, time associated with each of the services shown in FIG. 5 may be as shown in Table 1.

TABLE 1

| Service | Time Stamp |
|---------|------------|
| A | 12:00-3:00 |
| B | 12:10-2:35 |
| C | 12:30-2:20 |
| D | 1:10-2:10 |
| E | 12:10-2:50 |
| F | 12:55-1:45 |

Figure 6:
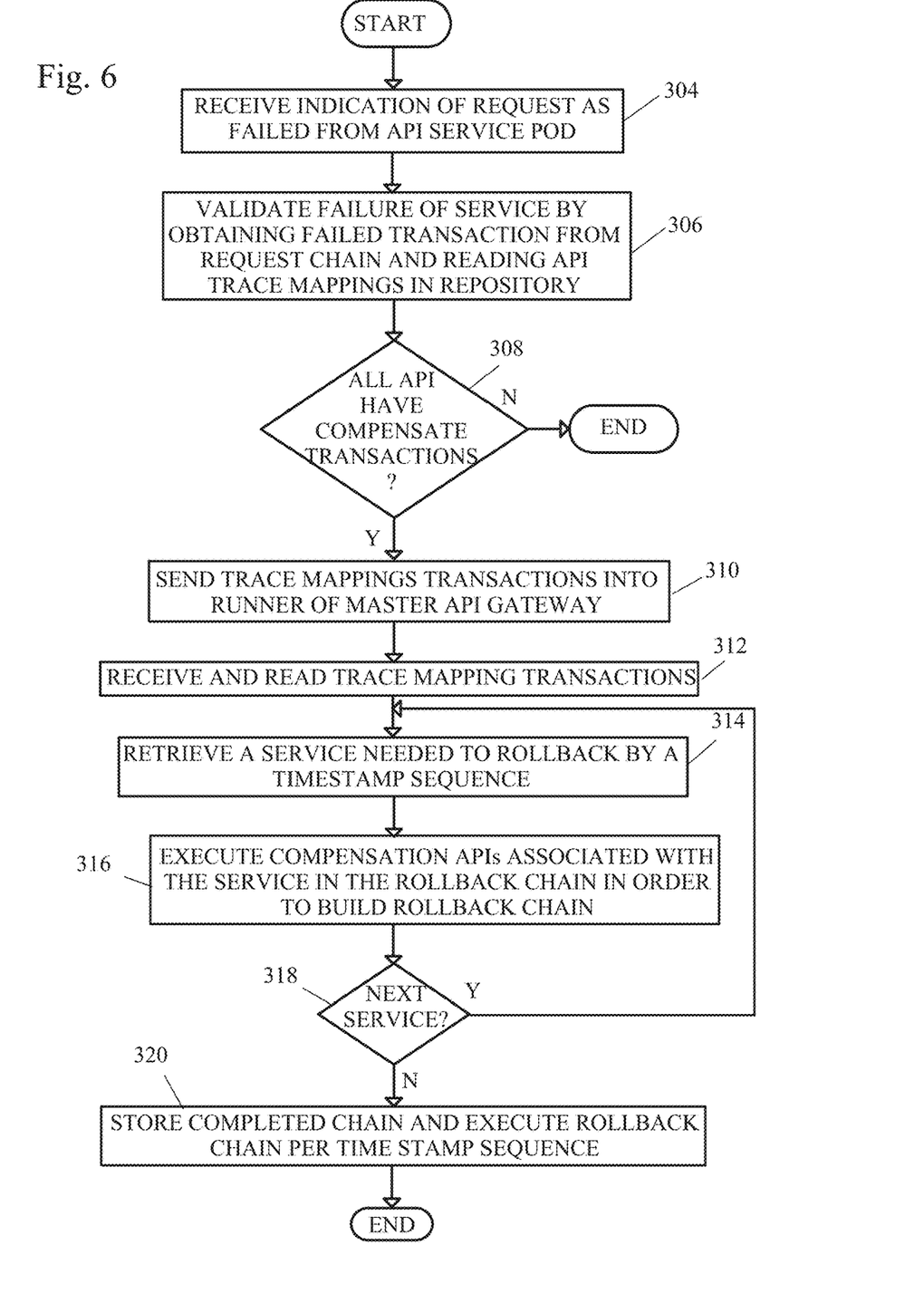
FIG. 6 shows a flow diagram depicting an embodiment of a method of rolling back dependency services in cloud environment.

FIG. 6 shows a flow diagram depicting an embodiment of a method of rolling back dependency services in cloud environment. It should be noted that the method of FIG. 6 takes place after a request has been sent to a service pod and executed by at least one service pod.

In a first step, an indication of a request is returned as failed from an API service pod, is received (step 304), for example by the validator component 201 of the master API gateway 200. The request that is returned as failed is preferably not equivalent to the original request made to the API service pod or a failure associated with the first service pod.

The failure of the service is validated, for example by the validator component 201 of the master API gateway 200, by obtaining a failed transaction from a request chain and reading API trace mappings in a repository 203 (step 306).

Table 2 shows services and associated trace mappings. In this example, the compensate type is defined as follows:

1—service needs to compensate when the service fails via a compensate transaction 2—service does not need to compensate with a compensate transaction when the service fails 3—service cannot compensate for service failure with a compensate transaction Based on the compensate type, if the service is a type 1 compensate type, the service will rollback. If the service is a type 2 or type 3 compensate type, the service will not rollback.

TABLE 2

| Services | API | Compensate API | Compensate Type |
|----------|-----|----------------|-----------------|
| Service A | A1 | — | 3 |
| Service A | A7 | A7' | 1 |
| Service B | A3 | A3' | 1 |
| Service B | A5 | A5' | 1 |
| Service B | A99 | — | 2 |
| Service C | A6 | — | 2 |

An example of the pseudocode associated with the compensate types is shown below:

```
static_resources:
  listeners:
  - address:
      socket_address:
        address: 0.0.0.0
        port_value: 80
    filter_chains:
    -filters:
    -name: envoy.http_connection_manager
      config:
        codec_type: auto
        stat_prefix: ingress_http
        route_config:
          name: local_route
          virtual_hosts:
          -name:backend
            domains:
```

```
        -"*"
      routes:
      -match:
            prefix:"/service/1"
            route:
                cluster: service1
      -match:
            prefix: "/service/2"
            route:
                cluster: service2
      http_filters:
      -name: envoy.router
            Config:{ }
clusters:
-name: service1
    connect_timeout: 0.25s
    type: strict_dns
    lb_policy: round_robin
    http2_protocol_options: { }
    hosts:
    -socket_address:
            address: service1
            port_value: 80
-name: service2
    connect_timeout: 0.25s
    type: strict_dns
    lb_policy: round_robin
    http2_protocol_options: { }
    hosts:
    -socket_address:
            address: service2
            port_value: 80
```

If the validator component 201 of the master API gateway 200 determines that all of the API trace mappings do not have compensate API transactions (step 308), the method ends.

If the validator component 201 of the master API gateway 200 determines that all of the API trace mappings have compensate API transactions (step 308), the validator sends trace mappings transaction information to the runner component 202 of the master API gateway 200 (step 310).

The runner component 202 of the master API gateway 200 receives and reads the trace mappings transaction information (step 312).

The runner component 202 of the master API gateway 200 retrieves a service needed to rollback by a timestamp sequence (step 314).

The runner component 202 then executes the compensate API transaction associated with the service of the rollback chain in order to build the rollback chain (step 316).

If there is a next service in the rollback chain (step 318), the method returns to step 314.

If there are not additional next services in the rollback chain (step 318), the runner component 202 stores the completed chain and executes the rollback chain per the time stamp sequence (step 320) and the method ends.

An example of associated pseudocode for the compensate APIs is shown below.

```
Schemes:
    -https
    /v1/order_flight:
        post:
            compensate_type: 1
            compensate_peer:/compensate/v1/order_flight
            description: Order a new flight or verify the order with
specified configurations.
            Parameters:
                -  name:vcenter_order_data
                    description:Order specification with
                    configurations.
                    Required:true
                Responses:
                    '200':
    /compensate/v1/order_flight
        Post:
            Type:
                Compensate
            parameters:
            -name: vcenter_order_data
                description: Order specification with configurations.
                Required: true
            Responses:
                '200':
                    Description: Success. The request has been
                    successfully verified.
```

Pseudocode associated the trace mappings is shown below.

```
kind: Deployment
apiVersion: extensions/v1beta1
metadata:
    name:order_flight-2nd
    namespace: ORDER_NS
    labels:
            app: order_flight
            index: 2nd
spec:
    replicas:1
    revisionHistoryLimit:0
    template:
        metadata:
            name: order_flight
        spec:
            containers:
                -
                    name: order_flight-cont
                    image: 'us.icr.in/img/order_flight:IMAGE_TAG'
                    swagger_path:
/var/apps/knative-samples/swagger/order-flight-definition.yaml
                    env:
                        -
                            Name: PYPATH
                            Value: /flight_test
```

Figure 7:
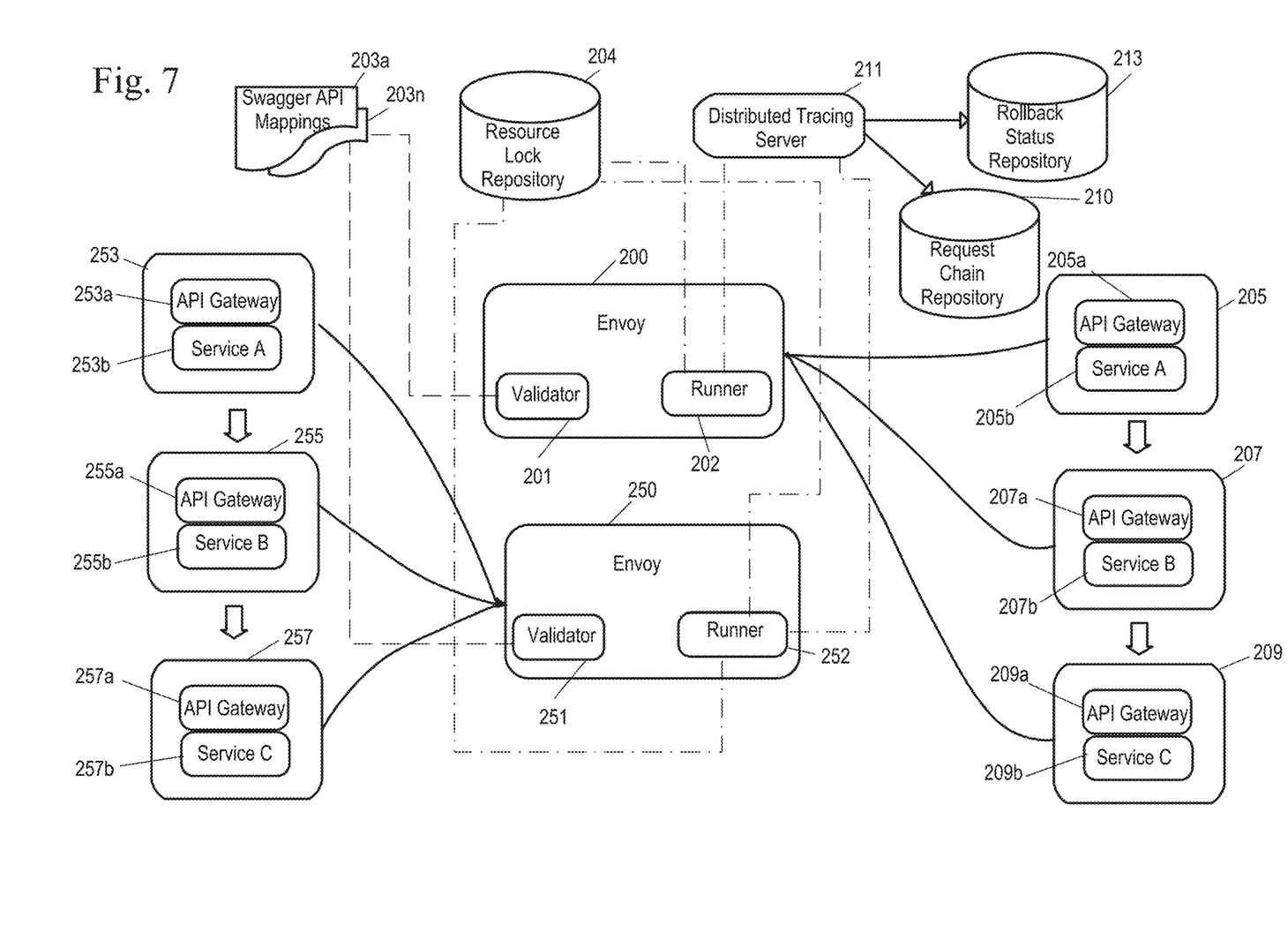
FIG. 7 shows a schematic of the services relative to envoys for multiple transaction isolation.

FIG. 7 shows a schematic of the services relative to envoys for multiple transaction isolation.

A first master API gateway 200 and a second master API gateway 250 are present in the system. The first master API gateway 200 and the second master API gateway 250 are each connected to a resource lock storage repository 204. The first master API gateway 200 includes a first validator component 201 and a first runner component 202. The second master API gateway 250 includes a second validator component 251 and a second runner component 252. The first master API gateway 200 is connected to an edge service or API Gateway, for example Envoy of a plurality of pods 205, 207, 209 interconnected into a first federation. Pod 205 includes a service A container 205*b* and an API gateway 205*a*; pod 207 includes a service B container 207*b* and an API gateway 207*a*; pod 209 includes a service C container 209*b* and an API gateway 209*a*. The second master API gateway 250 is connected to an edge service or API Gateway, for example Envoy of a plurality of pods 253, 255, 257 which are interconnected into a second federation. Pod 253 includes a service A container 253*b* and an API gateway 253*a*; pod 255 includes a service B container 255*b* and an API gateway 255*a*; pod 257 includes a service C container 257*b* and an API gateway 257*a*. Additional pods, federations and master API gateways can be present in the system, but are limited to three for illustration purposes.

It should be noted that each API gateway in each of the pods includes programming that monitors and receives tracing information or mappings submitted by applications in the pod via a library.

The first validator component 201 and the second validator component 251 are in communication with a plurality of API mappings 203a-203n. The connection between the first validator component 201 and the second validator component 251 are shown in dashed lines. The first runner component 202 and the second runner component 252 are both in communication with a distributed tracing server 211 with access to a repository of request chains 210, rollback status of pods and their associated services 213, and the resource lock storage repository 204. The connections of the first and second runner components 202, 252 is shown by dash-dot lines. The first and second validator components 201, 251 determine whether rollback of an entire service chain needs to occur or not when a service fails. The first and second runner components 202, 252 generate the reverse invocation chain and executes the rollback when necessary.

Figure 8:
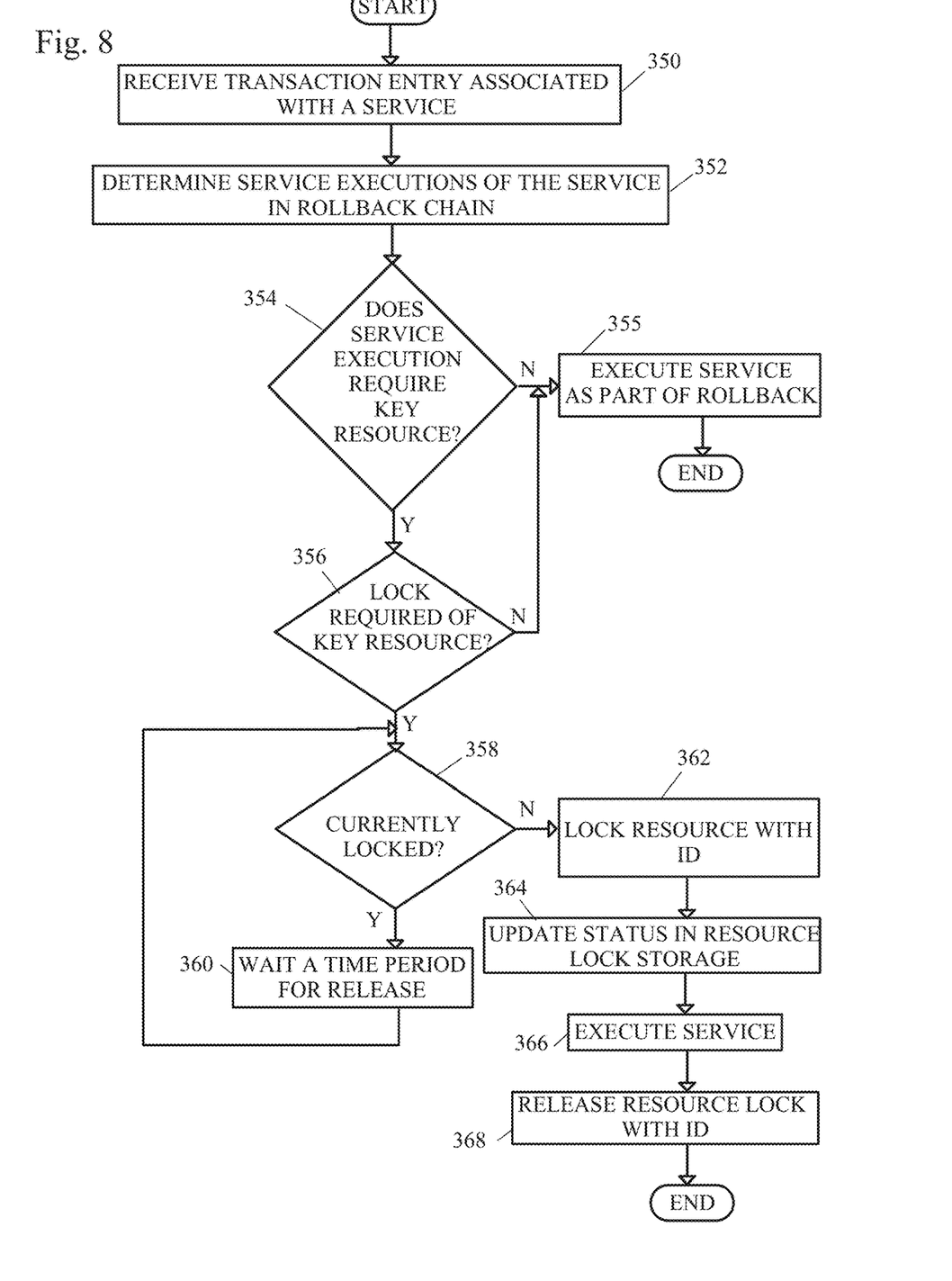
FIG. 8 shows a flow diagram depicting an embodiment of a method for isolating multiple transactions.

FIG. 8 shows a flow diagram depicting an embodiment of a method for isolating multiple transactions. Transaction that need to executed as part of a rollback may need to be isolated as they require specific resources to execute the rollback appropriately, especially when more than one master API gateway is present. Each master API gateway preferably executes the method of FIG. 6 relative to their pods. The method of FIG. 8 can take place during step 316 of FIG. 6. When a master API gateway locks a key resource, all remaining master API gateways cannot utilize the same key resource until it has been released or unlocked again.

In a first step, a transaction entry with a service that failed is received by the runner of a master API gateway (step 350).

The runner component of the master API gateway determines service executions of the service within a rollback chain (step 352).

The runner component of the master API gateway, when determining the rollback chain, determines whether the service execution of the service requires key resources (step 354).

If the service execution of the service does not require key resources (step 354), the service is executed as part of the rollback (step 355) and the method ends.

If the service execution of the service does require key resources (step 354), the runner component determines whether the key resources are lockable resources (step 356).

If the key resources are not lockable resources (step 356), the service is executed as part of the rollback (step 355) and the method ends.

If the key resource are lockable resources (step 356), the runner component determines whether the key resource is current locked (step 358). If the key resource is currently locked (step 358), the runner component waits a time period for release or unlocking of the key resource (step 360) and the method returns to step 358.

If the key resource is not currently locked (step 358), the runner component locks the resource with an identification number (step 362). The runner component updates the status in the resource lock storage 204 (step 364), which is accessible by both the first master API gateway 200 and the second master API gateway 250.

The service using the key resource is executed as part of the rollback (step 366) and the resource is released or unlocked with the identification number (step 368) and the method ends.

TABLE 3

| Request | ID Number | Transactional | Return Code | Services |
|---|---|---|---|---|
| URL-1(Request 1) | 10245 | N | 200 | Service C |
| URL-2(Request 2) | 10648 | Y | 200 | Service C |
| URL-3(Request 3) | 10899 | N | 500 | Service C |
| URL-4(Request 4) | 11004 | Y | 500 -> 501 | Service C |
| URL-5(Request 5) | 11010 | N | 201 | Service C |
| URL-6(Request 6) | 12456 | N | 401 | Service C |

The above request in Table 3 are made by a single master API gateway. The return code is an http status code defined by a standard HTTP/1.1 standard (RFC 7231) and is indicative of the status of one service or request. For example, a code of 2xx corresponds to the request was successfully received, understood and accepted; a code of 4xx corresponds to the request containing bad syntax or cannot be fulfilled; a code of 4xx corresponds to a error in which the server failed to fulfill an apparently valid request. More specifically, the codes in Table 2 correspond to the following: 200 OK; 201 Created; 401 Unauthorized; 500 Internal Server Error; and 501 Not Implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing multiple chain transaction rollback in a distributed system of at least one federation of a plurality of interconnected pods in communication with a master application programming interface gateway, the method comprising the steps of:
   receiving, by a validator component of the master application programming interface gateway, an indication of a request of a service container of a pod of the plurality of interconnected pods as failed from an application programming interface gateway of the pod;
   validating, by the validator component, failure of the service container of the pod by:
      obtaining at least one failed transaction from a request chain of the request of the service container; and
      reading application programming interface trace mappings from service containers within the request chain;
   determining, by the validator component, whether all application programming interfaces of the service containers in the request chain have compensate transactions;
   sending, by the validator component, the trace mappings of the service containers in the request chain that have compensate transactions, to a runner component of the master application programming interface gateway;
   receiving, by the runner component of the master application programming interface gateway, trace mappings from the validator component;
   retrieving, by the runner component, a service container needed to rollback by a timestamp sequence;
   executing, by the runner component, the compensate transactions associated with the service containers in a rollback chain in the timestamp sequence to build the rollback chain; and
   executing, by the runner component, the rollback chain.

2. The method of claim 1, further comprising a distributed tracing server in communication with the runner component of the master application programming interface gateway and with at least a repository of rollback statuses of service containers and request chains.

3. The method of claim 1, further comprising a repository of resources required for rollback of the rollback chain.

4. A computer program product for managing multiple chain transaction rollback comprising:
    one or more computer-readable storage media having computer-readable program instructions stored on the one or more computer-readable storage media, said program instructions executable by a master application programming interface gateway computer in a distributed system of at least one federation of a plurality of interconnected pods in communication with the master application programming interface gateway computer, the master application programming interface gateway computer comprising at least one processor, one or more memories, a validator component, and a runner component, the program instructions executing a computer-implemented method comprising:
        receiving, by the validator component of the master application programming interface gateway computer, an indication of a request of a service container of a pod of the plurality of interconnected pods as failed from an application programming interface gateway of the pod;
        validating, by the validator component, failure of the service container of the pod by:
            obtaining at least one failed transaction from a request chain of the request of the service container; and
            reading application programming interface trace mappings from service containers within the request chain;
        determining, by the validator component, whether all application programming interfaces of the service containers in the request chain have compensate transactions;
        sending, by the validator component, the trace mappings of the service containers in the request chain that have compensate transactions, to a runner component of the master application programming interface gateway computer;
        receiving, by the runner component of the master application programming interface gateway computer, trace mappings from the validator component;
        retrieving, by the runner component, a service container needed to rollback by a timestamp sequence;
        executing, by the runner component, the compensate transactions associated with the service containers in a rollback chain in the timestamp sequence to build the rollback chain; and
        executing, by the runner component, the rollback chain.

5. The computer program product of claim 4, further comprising a distributed tracing server in communication with the runner component of the master application programming interface gateway computer and with at least a repository of rollback statuses of service containers and request chains.

6. The computer program product of claim 4, further comprising a repository of resources required for rollback of the rollback chain.

7. A computer system comprising:
    at least one processor;
        one or more memories;
        a runner component;
        a validator component;
        one or more computer readable storage media having program instructions executing a computer-implemented method for managing multiple chain transaction rollback in a distributed system of at least one federation of a plurality of interconnected pods, each pod having at least a service container in communication with the computer system, the program instructions comprising:
            receiving, by the validator component, an indication of a request of a service container of a pod of the plurality of interconnected pods as failed from an application programming interface gateway of the pod;
            validating, by the validator component, failure of the service container of the pod by:
                obtaining at least one failed transaction from a request chain of the request of the service container; and
                reading application programming interface trace mappings from service containers within the request chain;
            determining, by the validator component, whether all application programming interfaces of the service containers in the request chain have compensate transactions;
            sending, by the validator component, the trace mappings of the service containers in the request chain that have compensate transactions, to the runner component;
            receiving, by the runner component, trace mappings from the validator component;
            retrieving, by the runner component, a service container needed to rollback by a timestamp sequence;
            executing, by the runner component, the compensate transactions associated with the service containers in a rollback chain in the timestamp sequence to build the rollback chain; and
            executing, by the runner component, the rollback chain.

8. The computer system of claim 7, further comprising a distributed tracing server in communication with the runner component, the distributing tracing server in communication with at least a repository of rollback statuses of service containers and request chains.

9. The computer system of claim 8, wherein the distributed system is a Kubernetes distributed system.

10. The computer system of claim 8, wherein the distributed system is in a cloud environment.

11. The computer system of claim 7, further comprising a repository of resources required for rollback of the rollback chain.

* * * * *